United States Patent [19]
Wallis

[11] Patent Number: 5,261,262
[45] Date of Patent: Nov. 16, 1993

[54] METHOD AND APPARATUS FOR CUTTING CORRUGATED WEBS HAVING LOUVERS

[76] Inventor: Bernard J. Wallis, 2215 Dacosta, Dearborn, Mich. 48128

[21] Appl. No.: 844,440

[22] Filed: Mar. 2, 1992

[51] Int. Cl.$^5$ .................... B21D 53/02; B26D 5/16
[52] U.S. Cl. .......................... 72/185; 83/646
[58] Field of Search ............... 72/185, 187; 83/646, 83/647

[56] References Cited

U.S. PATENT DOCUMENTS

| | | | |
|---|---|---|---|
| 2,071,584 | 2/1937 | Shippy | 72/185 |
| 3,513,740 | 5/1970 | Burghart | 83/646 |
| 3,885,413 | 5/1975 | Auer | 72/187 |
| 4,054,076 | 10/1977 | Kumabe | 83/646 |
| 4,516,457 | 5/1985 | Bartesaghi | 83/646 |
| 4,956,987 | 9/1990 | Hara et al. | 72/185 |

*Primary Examiner*—Lowell A. Larson
*Assistant Examiner*—Michael J. McKeon
*Attorney, Agent, or Firm*—Barnes, Kisselle, Raisch, Choate, Whittemore & Hulbert

[57] ABSTRACT

A method and apparatus for cutting corrugated webs having louvers from a strip which is continuously formed to define undulating fins or corrugations extending transversely of the strip. The method and apparatus comprises periodically interrupting the movement of the corrugated strip, locating the strip, and severing the corrugation along an apex by moving a shearing cutting blade such that the blade is moved to engage and cut beginning at one longitudinal edge and progressively across the apex of the corrugation to the other edge of the corrugation. The apparatus functions to lift the knife blade initially to separate the corrugation thereby moving louvers out of contact with one another such that the louvers would not be severed by the movement of the knife blade.

7 Claims, 6 Drawing Sheets

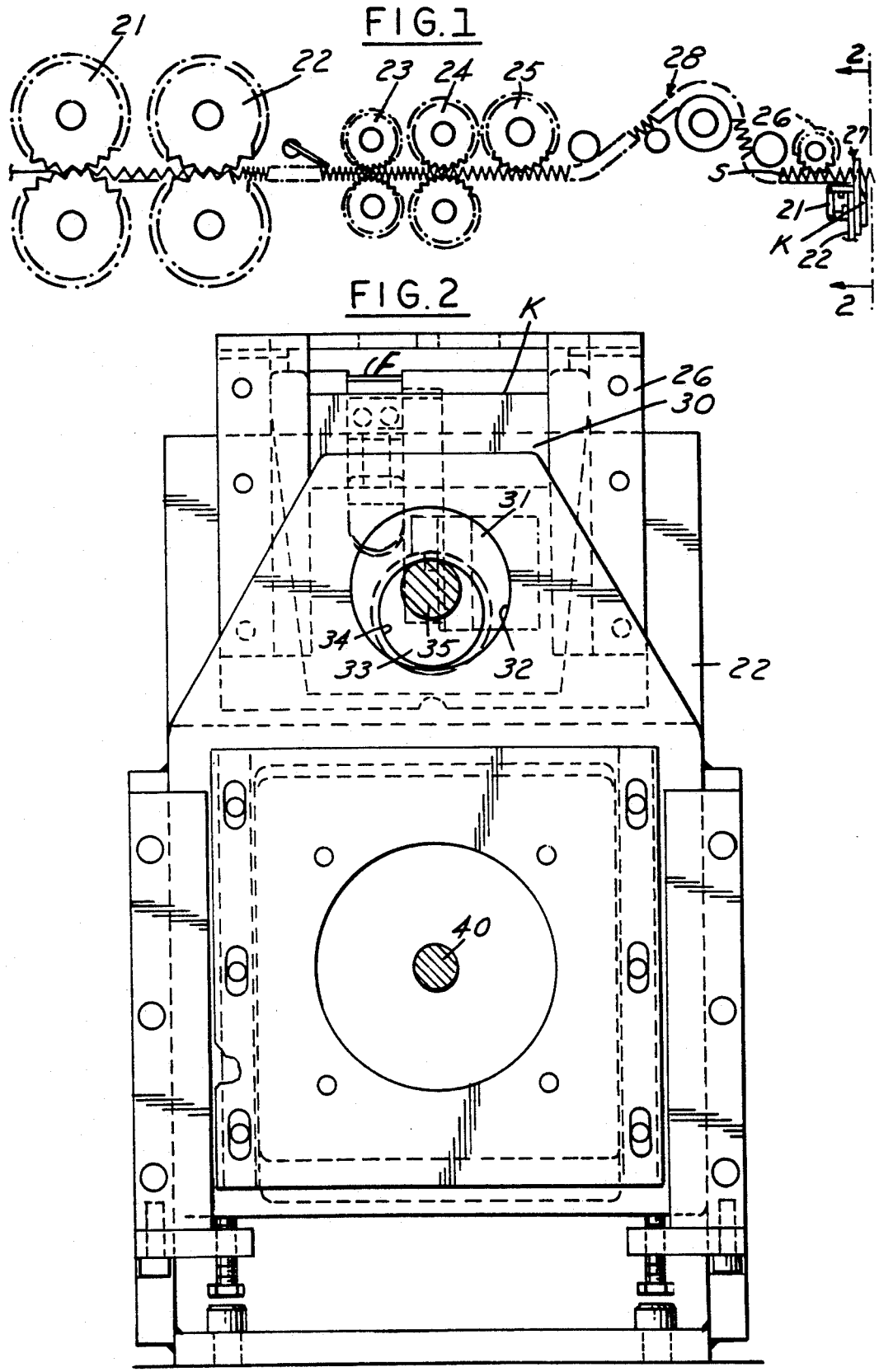

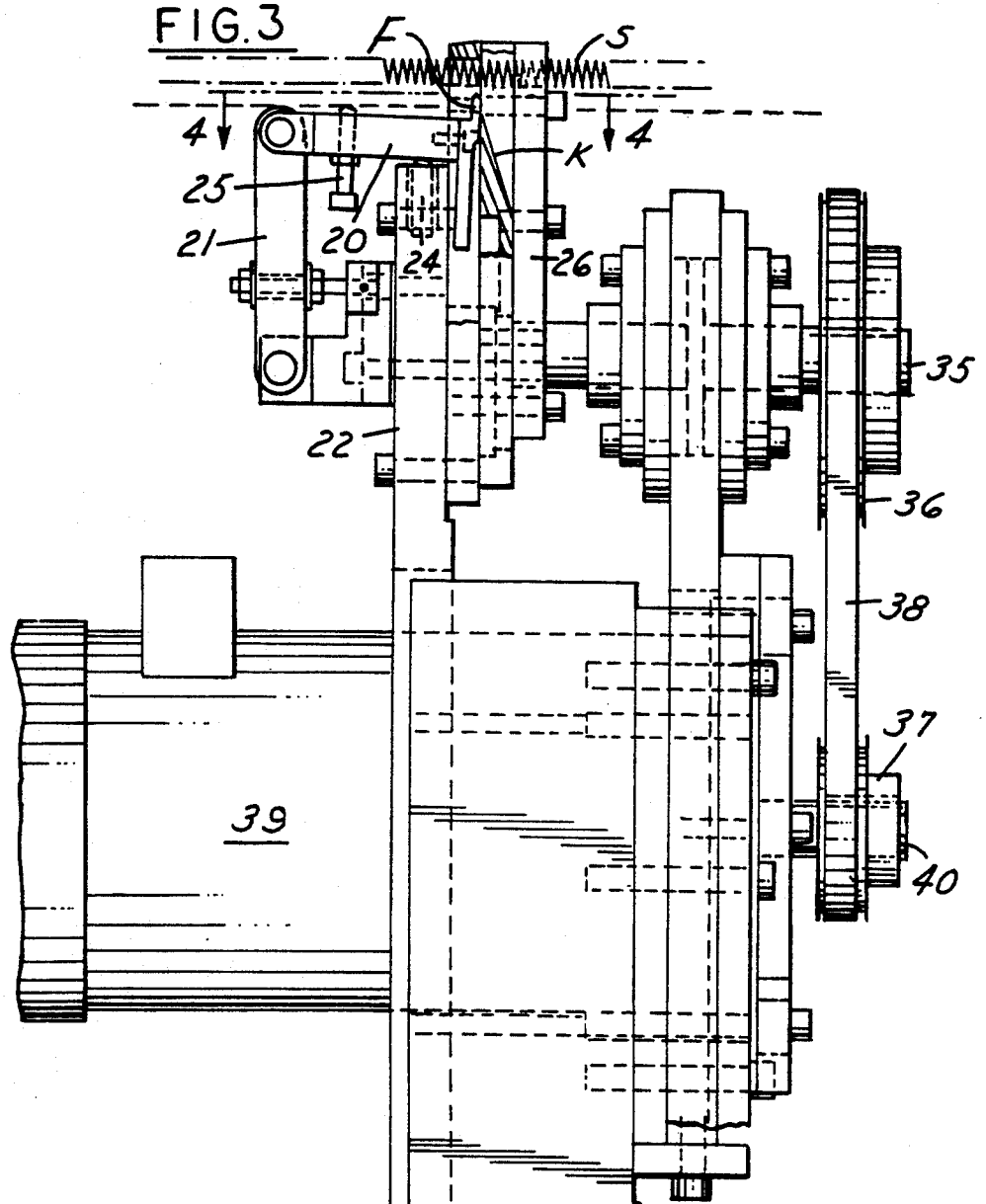
FIG.3
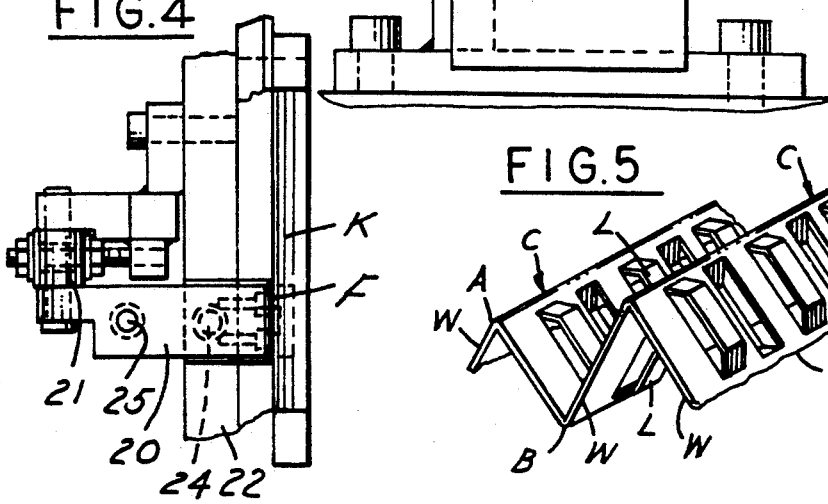
FIG.4
FIG.5

METHOD AND APPARATUS FOR CUTTING CORRUGATED WEBS HAVING LOUVERS

This invention relates to making continuous corrugated strips and particularly to the cutting of predetermined lengths from such corrugated strips.

BACKGROUND AND SUMMARY OF THE INVENTION

It is well known to form corrugated strips for use in various devices such as the fins of heat exchangers by moving a flat strip continuously between forming rolls and thereafter through packing rolls to a cutting position, interrupting the movement momentarily at the cutting station and cutting a predetermined length of web from the strip. If the length of corrugated strip is not precisely controlled, the cutting may occur along portions other than the apices which connect the strip. The resultant edge is flawed, makes it difficult to handle the strip. In addition, such an edge can adversely affect the positioning of the strip in the device in which it is to be used.

The problem of cutting such strips is made more complex because of the differences in characteristics of materials. For example, some materials inherently remain in the formed position while others are readily deformed. This affects the spacing of the number of corrugations in any unit length. Specifically corrugations of copper tend to return to there original configuration and spacing if spread in longitudinal direction of the web. Aluminum, on the other hand, must be handled carefully since it does not tend to return to original configuration and spacing. The problem is further complicated by the fact that the spacing of the corrugations may be such that it is difficult to move a cutter into position for cutting at the apex the corrugation.

In U.S. Pat. No. 5,069,053 issued Dec. 3, 1991, there is disclosed and claimed a method and apparatus for cutting corrugated webs from a strip which is continuously formed to define transverse undulating fins or corrugations comprises periodically interrupting the movement of the corrugated strip, spreading a corrugation in the direction of the longitudinal axis of the strip and severing the corrugation at the spread corrugation and the apex of the corrugation. More specifically, the corrugated strip is interrupted, adjacent corrugations are moved longitudinal relative one another to locate the corrugation to be cut and a cutter is moved between the adjacent apices to cut the connecting oppositely disposed apex In one form adjacent apices are engaged and spread apart. In another form, a finger engages a side of a corrugation to position the corrugation to be cut.

In prior U.S. Pat. Nos. 4,262,568 and 4,507,948 other apparatus and mechanisms are shown for cutting corrugated strips.

Where the corrugated strips includes louvers which extend transversely of the strip, the louvers project into the space through which a saw or a knife blade would move and it has been found that the louvers have a tendency to interengage and the louvers are sometimes severed not only affecting the function of the fins and their ultimate use but, in addition, resulting in fragments of the light strip material being severed and have advertently affecting the functioning of the apparatus as well as contaminating the area of the apparatus.

Among the objectives of the present invention are to provide a method and apparatus for cutting corrugated strips and particularly strips having louvers wherein the louvers are not inadvertently severed; wherein the corrugations are severed accurately along the apex; and wherein the apparatus can be readily adapted to the conventional corrugating apparatus.

In the accordance with the invention, a method and apparatus for cutting corrugated webs having louvers from a strip which is continuously formed to define undulating fins or corrugations extending transversely of the strip. The method and apparatus comprises periodically interrupting the movement of the corrugated strip, locating the strip, and severing the corrugation along an apex by moving a shearing cutting blade such that the blade is moved to engage and cut beginning at one longitudinal edge and progressively across the apex of the corrugation to the other edge of the corrugation. The apparatus functions to lift the knife blade initially to separate the corrugation thereby moving louvers out of contact with one another such that the louvers would not be severed by the movement of the knife blade.

DESCRIPTION OF THE DRAWINGS

FIG. 1 is a diagrammatic view of an apparatus for forming the corrugated strips.

FIG. 2 is a sectional view on an enlarged scale taken along the line 2—2 in FIG. 1.

FIG. 3 is a side elevational view of the apparatus shown in FIG. 2.

FIG. 4 is a sectional view taken along the line 4—4 in FIG. 3.

FIG. 5 is a fragmentary perspective view of a portion of a corrugated strip which is to be cut.

FIGS. 9A through 9I are diagrammatic sectional views of the apparatus.

DESCRIPTION

Figure 6:
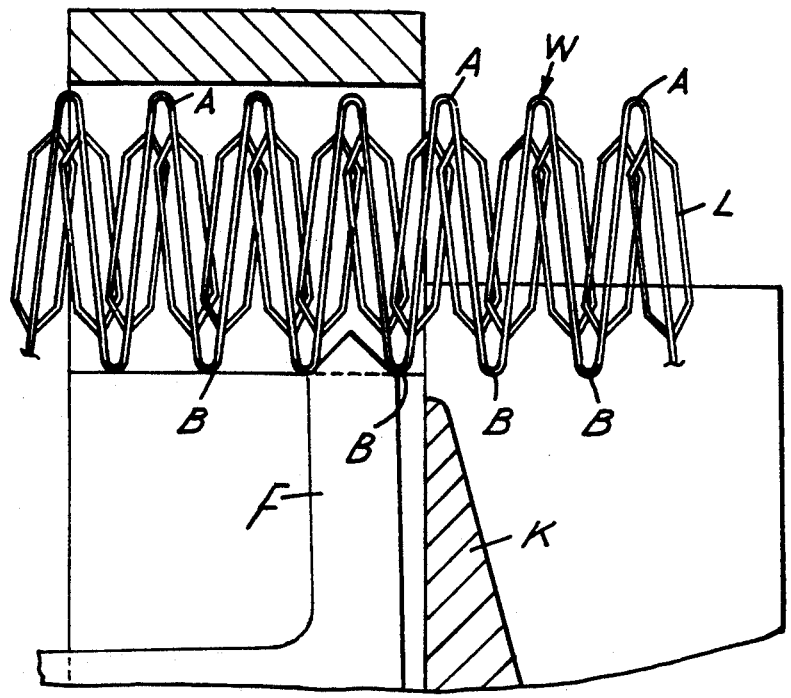
FIGS. 6–8 are diagrammatic views on a greatly enlarged scale showing the movement of the cutting blade during the operation of the apparatus.

Referring to FIG. 1, the invention relates to a corrugating apparatus of generally conventional construction wherein a strip S, for example, such as a metal strip of aluminum or copper, is delivered from a reel to a sets of forming rolls 21, 22 that form corrugations through to pairs of packing rolls 23, 24, 25 which determine the number of corrugations per unit length and then to a roll 26 that momentarily interrupts the movement of the corrugated strip so that a cutting apparatus 27 may function to cut a predetermined length from the corrugated strip. The space between the roll 25 and roll 26 is such that when the roll 26 is interrupted while the rolls 23–25 continue to rotate, the corrugated strip will accumulate in the area 28.

The method and apparatus of the present invention is intended particularly for use in connection with severing a web W as shown in FIG. 5 which comprises a plurality of corrugations C connected to one another at apices A, B and includes alternating louvers L along each wall W which are cut from the wall and are connected thereto their ends such as that the louvers extend transversely of each wall.

Figure 7:
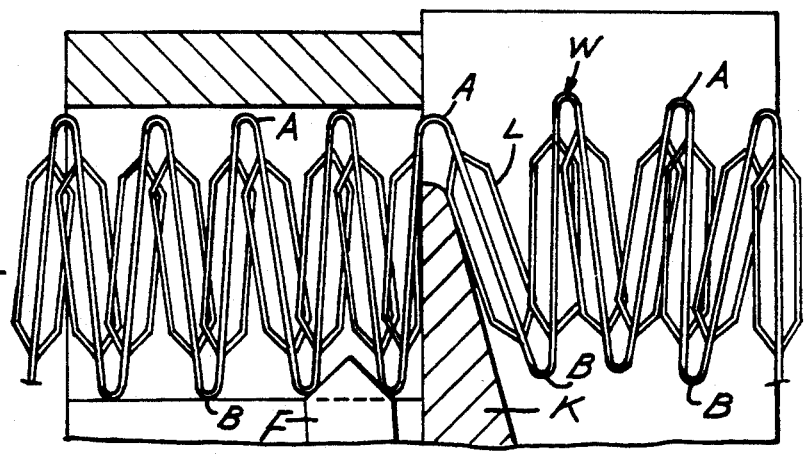
Figure 8:
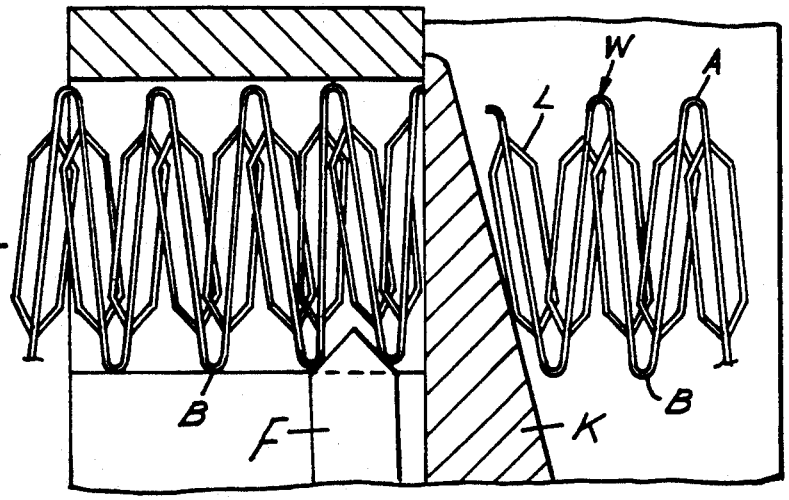

Referring to FIGS. 6–8, which are partly diagrammatic views on a greatly enlarged scale of the functioning of the method and apparatus, the corrugated strip or web is interrupted in its movement and a locator F is moved into position adjacent the apices B adjacent the corrugation which is to be cut. A knife blade K is then moved transversely of the strip and progressively separates the louvers L of the corrugation which is to be cut and severed. As the knife blade K moves further to sever the apex A, it is manipulated such that the knife blade K moves in an arc, as presently described.

Referring to FIGS. 2–4, the locator F is mounted by an arm 20 which in turn is pivoted to a lever 21 mounted on a frame 22. A spring loaded plunger 24 urges the locator F upwardly and an adjustable stop 25 limits the upward movement relative to the strip S. The knife blade K is mounted for sliding movement relative to the frame member 22 and a plate 26. As the knife blade K is moved upwardly, it engages the lever 20 moving the locator L upwardly. The knife blade K forms part of a knife blade supporting plate 30 that is moved and oscillated by an eccentric 31 rotatably mounted in an opening 32 in the knife blade supporting plate 30 into which an eccentric cam 33 is positioned in an opening 34 and is driven by shaft 35. The shaft 35 in turn is driven through pulleys 36, 37 and a belt 38 by motor 39 which has its output shaft 40 connected to the pulley 37.

Figure 9A:
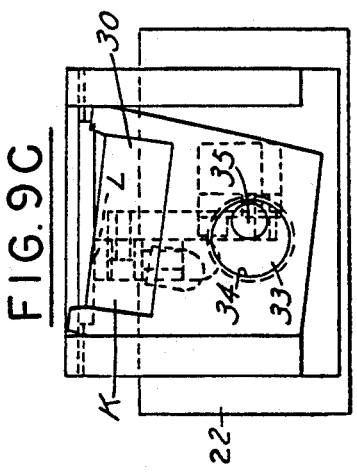
FIGS. 9A through 9I are diagrammatic end views of the apparatus.
Figure 9B:
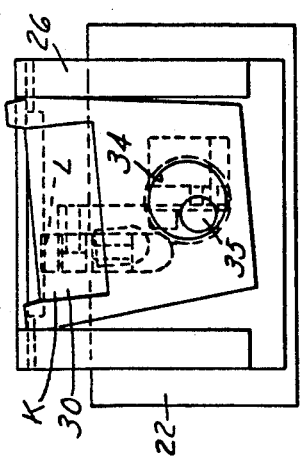
Figure 9C:
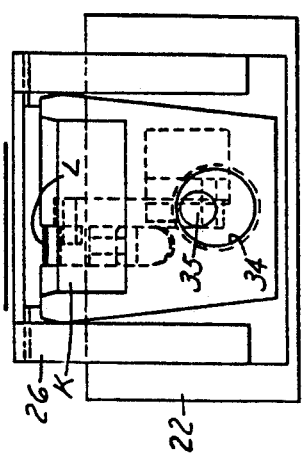
Figure 9D:
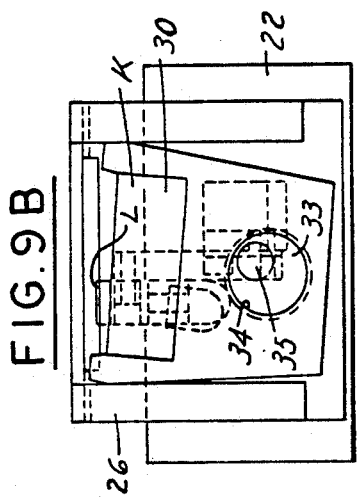
Figure 9E:
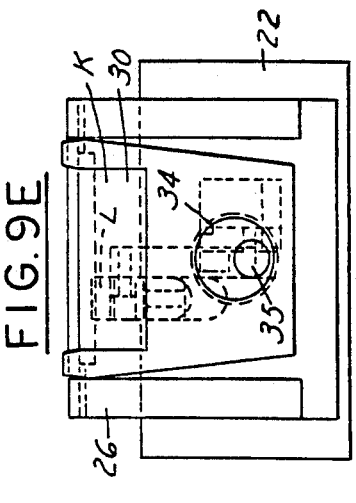
Figure 9F:
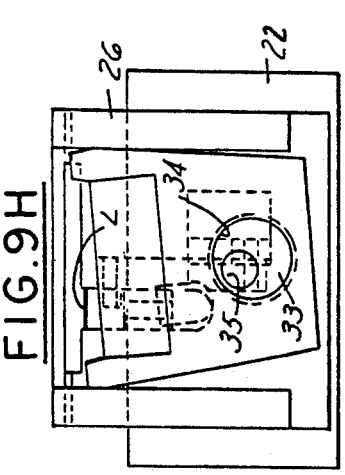
Figure 9G:
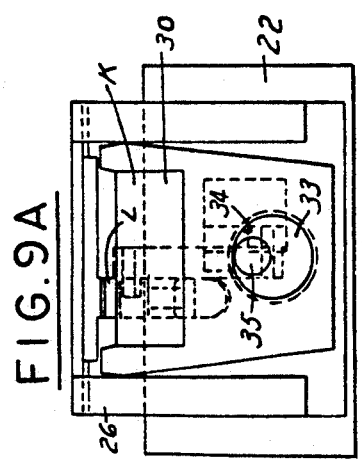
Figure 9H:
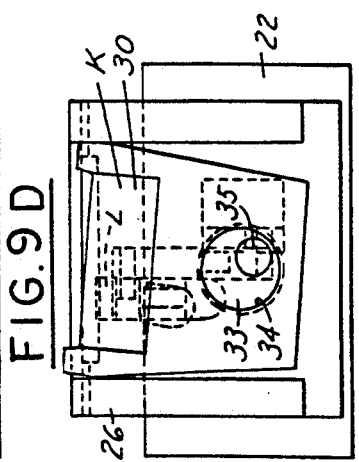
Figure 9I:
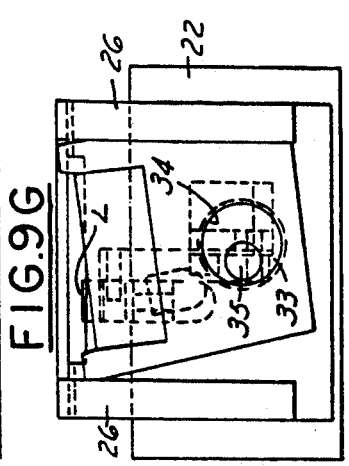
Figure 10A:
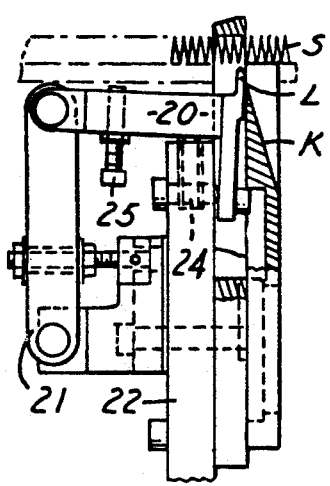
Figure 10B:
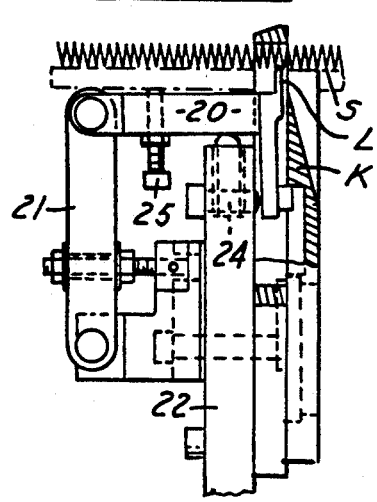
Figure 10C:
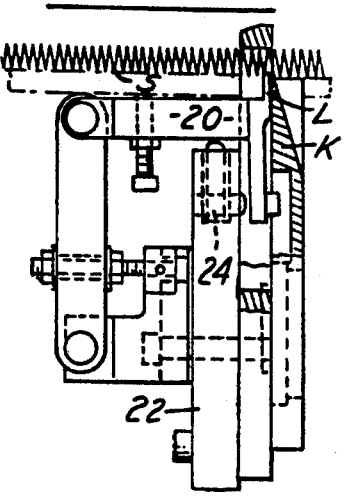
Figure 10D:
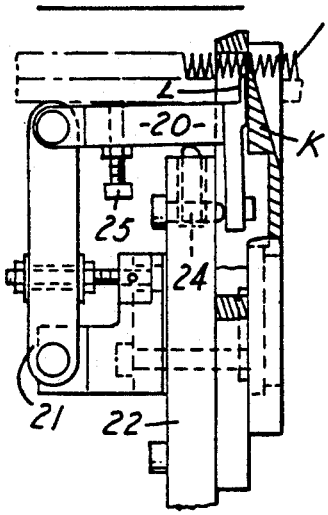
Figure 10E:
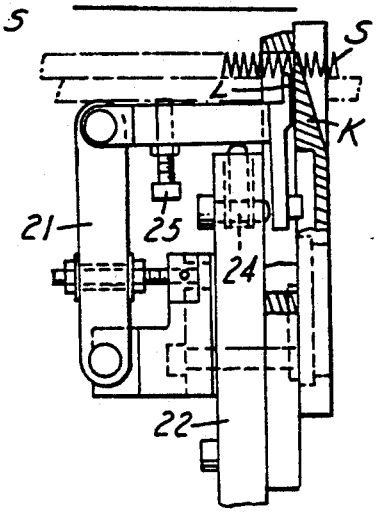
Figure 10F:
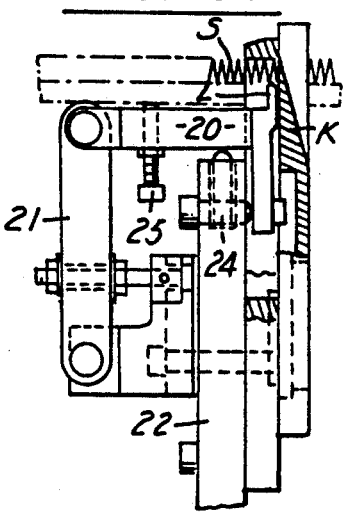
Figure 10G:
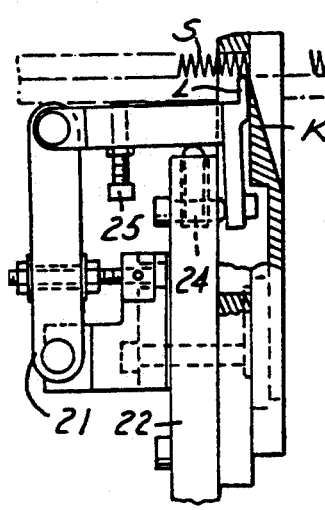
Figure 10H:
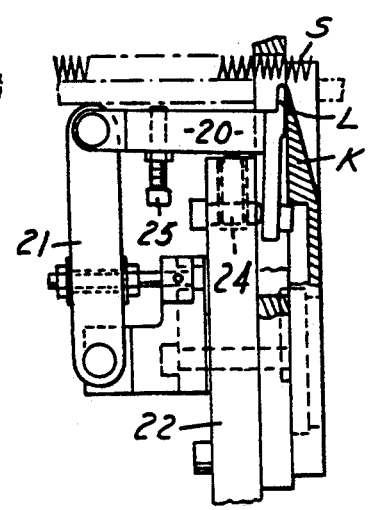
Figure 10I:
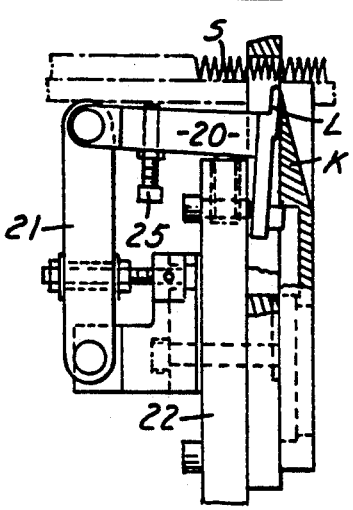

Referring to FIGS. 9A through 9I and FIGS. 10A through 10I which are partly diagrammatic views of the apparatus, corresponding numbers designating progressive positions of the knife blade, it can be seen that the knife blade K is initially raised to bring the locator member L into position and spread the corrugation as in FIG. 7. Continuous rotation of the eccentric causes the knife blade K to tilt continuously (FIG. 9B and 10B) until the knife blade K engages one longitudinal edge of the apex (FIGS. 9C and 10C). Continuous elevation of the knife blade K and continuous progressive movement of the knife blade causes it to progressively cut through the apex in cooperation with shear block B (FIGS. 9D, 9E, 9F and FIGS. 10D, 10E, 10F) until the apex is completely severed. Further continuous rotation of the eccentric causes the knife blade K to tilt continuously in the opposite direction from the initial tilting and simultaneously to be lowered (FIGS. 9F, 9G, 9H and FIGS. 10F, 10G, 10H), positions 9I and 10I corresponding to position 1.

Figure 11:
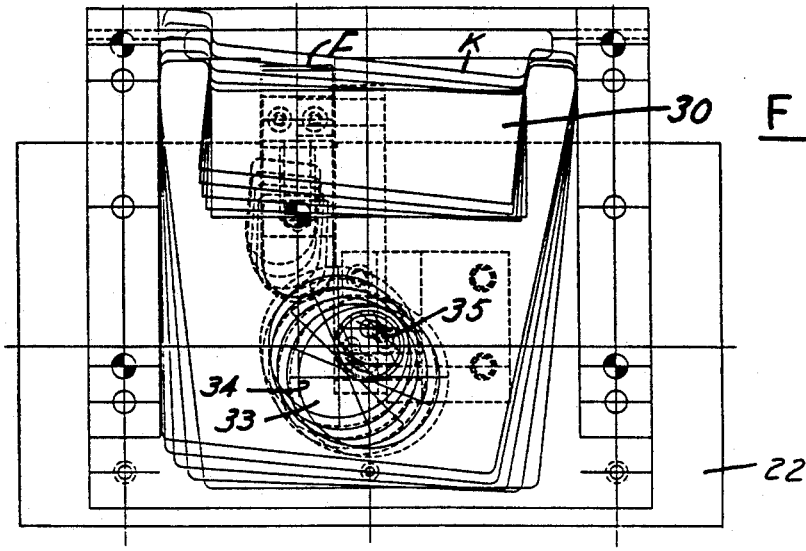
FIGS. 11–13 are partly diagrammatic views of FIGS. 9—1 to 9—9 showing the overlapping progressive movement of the cutting blade.
Figure 12:
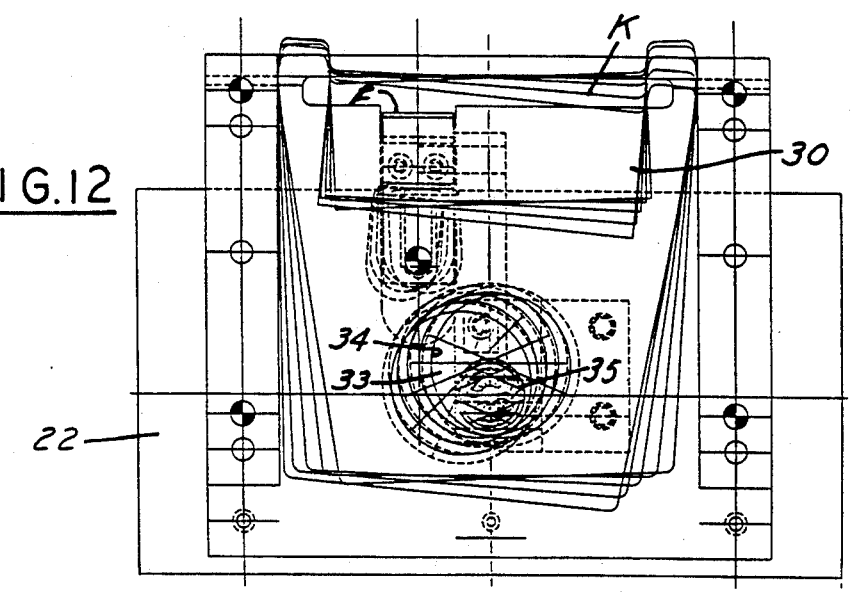
Figure 13:
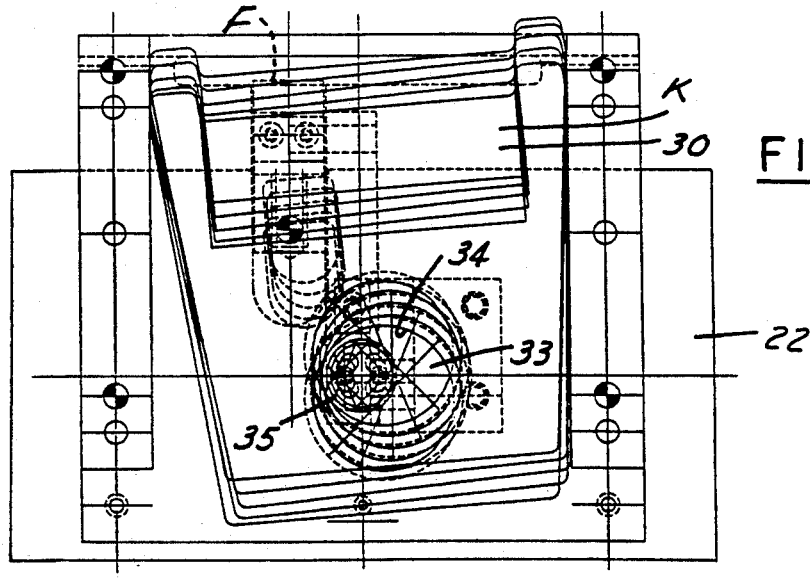

The continuous change in angle of the knife blade K relative to the axis of elevation of the knife blade K is shown by the diagrammatic views shown in FIGS. 11–13. It can be seen that during the cutting of the apex A, the knife blade is changing the angle of the cutting edge of the knife blade K so that as the knife blade K not only successively cuts the apex A but also changes in angle relative to the vertical axis of elevation of the knife blade K.

It can thus be seen that there has been provided a method and apparatus for cutting corrugated strips and particularly strips having louvers wherein the louvers are not inadvertently severed; wherein the corrugations are severed accurately along the apex; and wherein the apparatus can be readily adapted to the conventional corrugating apparatus.

I claim:

1. A method for cutting corrugated webs having louvers which may interlock from a strip which is continuously formed to define undulating fins or corrugations defining walls connected to one another at alternate opposed apices, extending transversely of the strip each wall being formed with louvers along the wall, which have a tendency to interengage, said method comprising moving said strip along a predetermined horizontal path with apices extending horizontally and transversely of the path, periodically interrupting the movement of the corrugated strip, locating the apex along which the strip is to be cut by elevating a locator into engagement with the apex on the strip opposite to the apex which is to be cut and upstream from the direction of the path of the strip, severing the corrugation along an apex by continuously moving a shearing knife blade upwardly and transversely of the strip such that the knife blade separates the louvers on the opposed walls of the apex which is to be cut such that the blade is continuously tilted and elevated from a horizontal position to engage and cut the apex in cooperation with a shear block beginning at one end of the apex and progressively cut the apex of the corrugation, while the angle of the knife blade continuously changes with respect to the horizontal apex being cut, continuously tilting and lowering the knife blade to return the knife blade to its original position for the beginning of another cycle, and lowering the locator for beginning another cycle.

2. The method set forth in claim 1 including positioning the locator with respect to the knife blade such that as the knife blade is elevated, the movement of the knife blade moves the locator to locate the strip and the continued movement of the knife blade separates the corrugation thereby moving louvers out of contact with one another such that the louvers will not be severed by the movement of the knife blade.

3. An apparatus for cutting corrugated webs having louvers from a strip which is continuously formed to define undulating fins or corrugations defining walls connected to one another at alternate opposed apices, each wall being formed with louvers along the wall which have a tendency to interengage, said apparatus comprising means for moving said strip in a predetermined horizontal path with the apices extending horizontally and transversely of the path, means for periodically interrupting the movement of the corrugated strip, locator means movable vertically for engaging the apex opposite to the apex which is to be cut and upstream from the direction of the path of the strip, means including a knife blade and associated shear block for severing the corrugation along an apex by continuously moving a shearing knife blade upwardly and transversely of the strip such that the knife blade separates the louvers on the opposed walls of the apex which is to be cut and such that the blade is continuously tilted and elevated from a horizontal position to engage and cut the apex in cooperating with a shear block beginning at one end of the apex and progressively cut the apex of the corrugation and the angle of the knife blade is continuously changed with respect to the horizontal apex being cut, said means for severing the corrugation being operable to tile and lower the knife blade to its original position for the beginning of another cycle.

4. The apparatus set forth in claim 3 wherein said severing means comprises a knife blade supporting plate which supports said knife blade, said knife blade supporting plate having an opening, an eccentric cam positioned in said opening and means for rotating said eccentric cam such that the knife blade is successively elevated, oscillated and lowered such that the knife blade is initially elevated to bring the locator member into position and spread the corrugations; continuous rotation of the eccentric causes the knife blade to tilt continuously until the knife blade engages one longitudinal end of the apex; continuous elevation of the knife blade and continuous progressive movement of the knife blade causes it to progressively cut through the apex in cooperation with the shear block until the apex is completely severed; further continuous rotation of the eccentric causes the knife blade to tilt continuously in the opposite direction from the initial tilting and simultaneously to be lowered such that the locator is elevated and lowered by said movement of said knife blade.

5. The apparatus set forth in claim 3 wherein said severing means comprises a knife blade supporting plate which supports said knife blade, said knife blade supporting plate having an opening, an eccentric cam positioned in said opening and means for rotating said eccentric cam such that the knife blade is successively elevated, oscillated and lowered such that the knife blade is initially elevated to bring the locator member into position and spread the corrugations; continuous rotation of the eccentric causes the knife blade to tile continuously until the knife blade engages one longitudinal end of the apex; continuous elevation of the knife blade and continuous progressive movement of the knife blade causes it to progressively cut through the apex in cooperation with the shear block until the apex is completely severed; further continuous rotation of the eccentric causes the knife blade to tilt continuously in the opposite direction from the initial tilting and simultaneously to be lowered.

6. The apparatus set forth in claim 5 wherein said locator means is constructed and arranged such that it is elevated into position by said severing means as the severing means is being elevated for cutting and such that said locator means is lowered as the severing means is being lowered to its position for beginning another cycle.

7. The apparatus set forth in claim 6 wherein said locator means comprises a locator mounted on an arm which is engaged by the knife blade when it is initially elevated to move the locator into locating position.

* * * * *